March 10, 1970     T. J. HARRIS ET AL     3,499,700

LIGHT BEAM DEFLECTION SYSTEM

Filed June 5, 1963     4 Sheets-Sheet 1

INVENTORS
THOMAS J. HARRIS
WERNER W. KULCKE

BY George W. Faile
ATTORNEY

March 10, 1970     T. J. HARRIS ET AL     3,499,700

LIGHT BEAM DEFLECTION SYSTEM

Filed June 5, 1963     4 Sheets-Sheet 2

United States Patent Office 3,499,700
Patented Mar. 10, 1970

3,499,700
LIGHT BEAM DEFLECTION SYSTEM
Thomas J. Harris, Poughkeepsie, and Werner W. Kulcke, Wappingers Falls, N.Y., assignors to International Business Machines Corporation, New York, N.Y., a corporation of New York
Filed June 5, 1963, Ser. No. 285,832
Int. Cl. G02f 1/24, 1/26
U.S. Cl. 350—150                                6 Claims

ABSTRACT OF THE DISCLOSURE

Light deflection apparatus is interposed between a source of a beam of plane polarized light and a target to deflect the beam to a selected position in the target. Each stage of the deflector includes in the order of the incoming light beam a first polarization rotator, a birefringent device which deflects the light in accordance with the plane of polarization established by the rotator, and a second polarization rotator which cancels any polarization change effected by the first rotator. The apparatus also deflects converging light through it to a location outside the apparatus.

---

Figure 1:
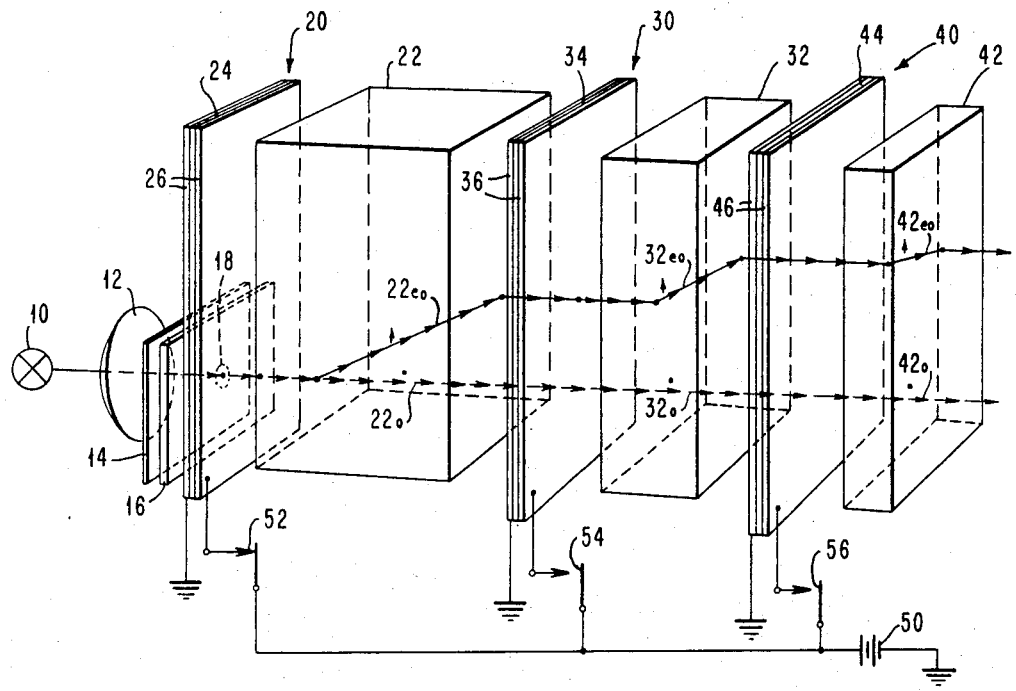

This invention relates to a high speed system for discretely positioning a small cross-sectional beam of light in response to an information source, and more particularly to a light beam deflection system using electro-optic techniques to digitally index the position of a beam of light.

There is a present need for systems useful for modulating and deflecting of light beams to a desired discrete position. The need for a near instantaneous, highly efficient light positioning system has become particularly desirable since the development of the microwave maser and laser. The laser has extended the scope of useful electro-magnetic radiation into the optical range. The present day availability of laser sources which produce beams of coherent, collimated, uniquely polarized, monochromatic light has the potential of increasing by several orders of magnitude the data handling rate and spacial resolution over even the advanced nanosecond technologies presently under development. The positioning of the laser light beam must be at extremely high speeds to take advantage of its unique characteristics.

Light positioning and modulating devices are known to the prior art. Light positioning devices have included the use of mirrors, mechanically moving diaphrams and the change in the optical properties of the medium through which the light is passed. The use of mechanical means and mirrors is unsatisfactory for high speed operation because of their speed limitations, tendency to be bulky and mass. Crystalline, liquid and gaseous mediums have been used in a wide variety of light deflecting devices. These devices have had, however, little application because of their size requirements necessary to give an adequate and useful displacement or modulation of the light beam from one extreme to the other. The main disadvantage of present devices is either they deflect the total light beam and then need infeasible high voltages for control, or at tolerable voltages they work as spacial selectors and pass only a small amount of light while absorbing the larger proportion.

It is thus an object of this invention to provide an improved light deflection system of compact size for discretely positioning a small cross-sectional light beam.

It is another object of this invention to provide a light deflector for discretely positioning a small cross-sectional light beam operative at extremely high speeds, having simple geometry and inexpensive to construct.

It is a further object of this invention to provide a light beam deflection system using electro-optic techniques to digitally index the position of a beam of light having the characteristics of good resolution and near-instantaneous speeds.

These and other objects are accomplished in accordance with the broad aspects of the present invention by providing a light deflector system including a plurality of light deflection stages. The light applied to the light deflection stages must be linearly polarized and either collimated or convergent. Each light deflection stage includes a first means for receiving as an input the small cross-sectional, linearly polarized light beam and providing an output of one of two possible light beams having polarization directions differing by 90 degrees. The second portion of each light deflection stage is a means for providing a deflection of the light beam when the beam is polarized in one direction and alternately for having no effect on the path of the light beam when the beam is polarized in the second direction. The control of the polarization of the incoming light beam by the first means, therefore, allows the selection of one of two spacially separated outputs from the deflection means in each light deflection stage. A series of such light deflection stages allows the precise positioning of the light beam over a large number of discrete output positions. The number of discrete output positions depends upon the number of light deflection stages used.

The foregoing and other objects, features and advantages of the present invention will be apparent from the following more particular description of the preferred embodiments of the invention as illustrated in the accompanying drawings.

Figure 2:
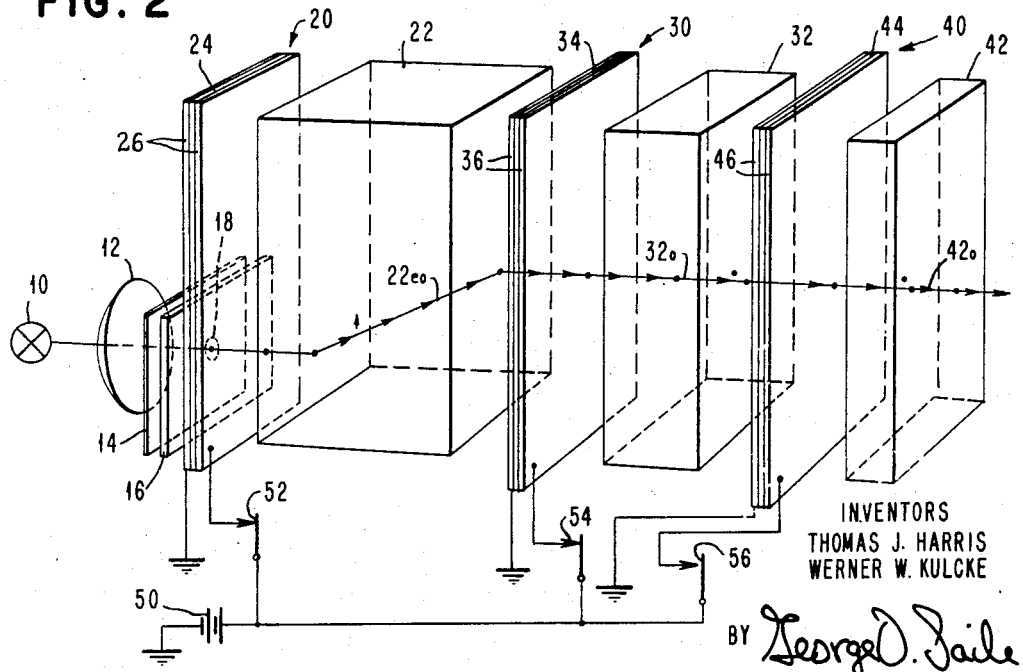
Figure 3:
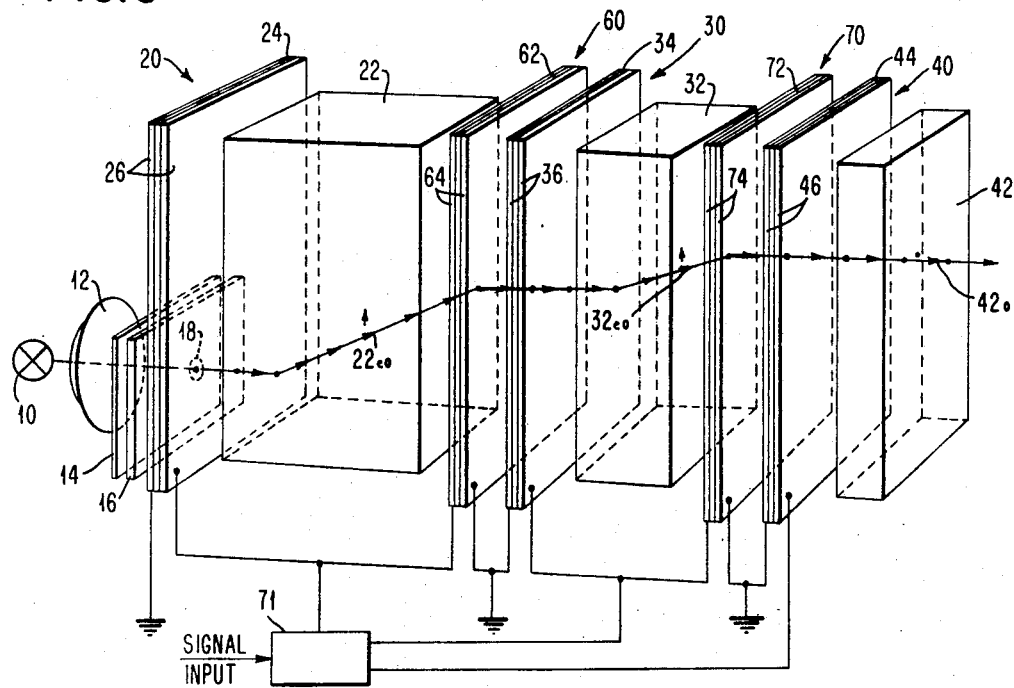
Figure 4:
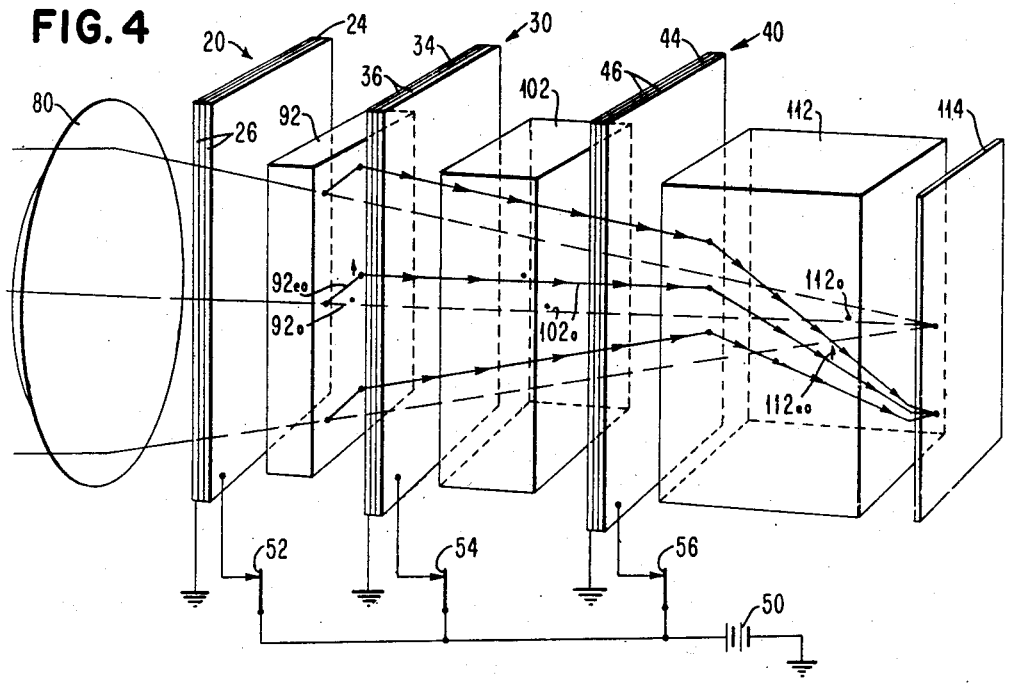
Figure 5:
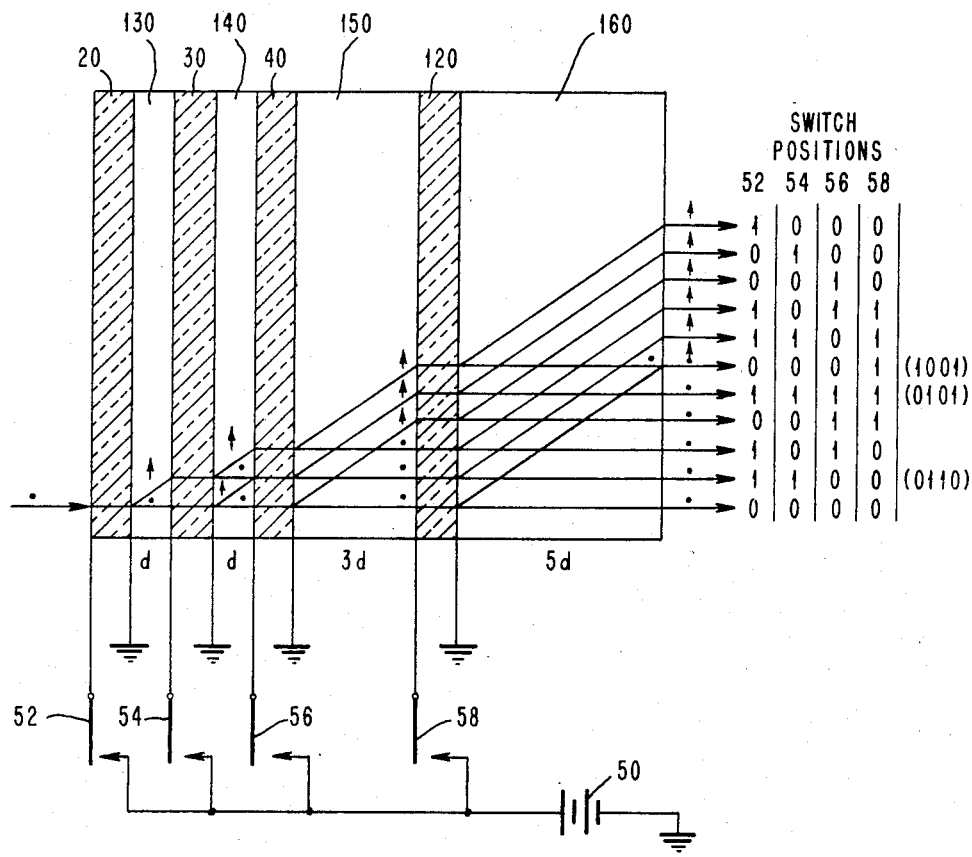
Figure 6:
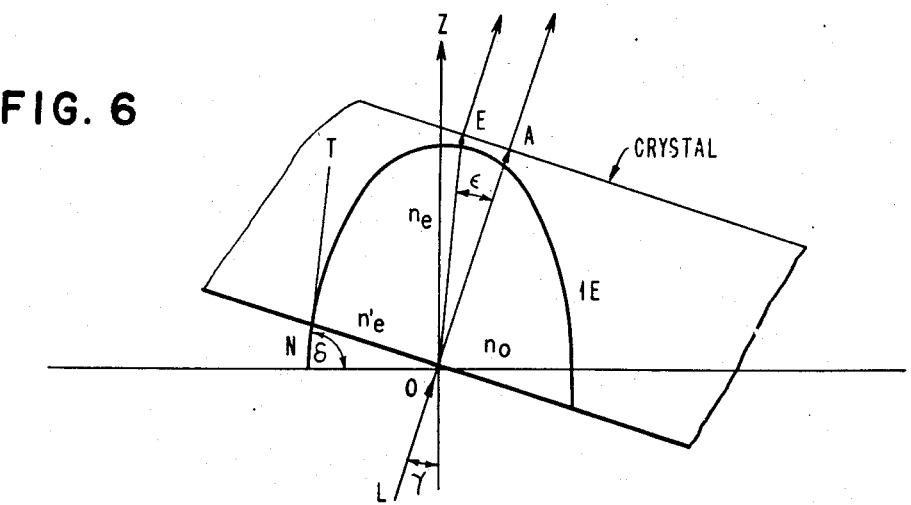
Figure 7:
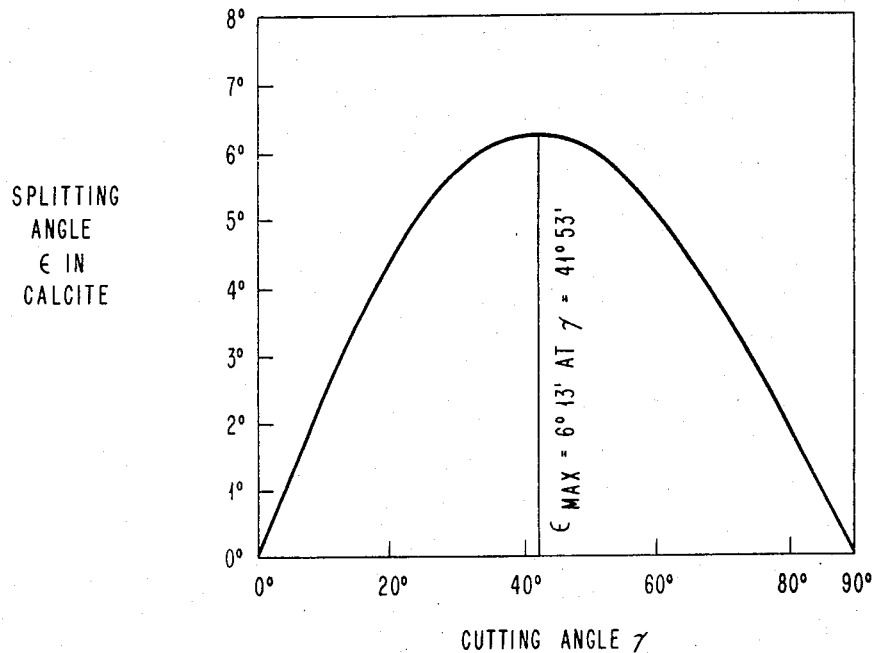
Figure 8:
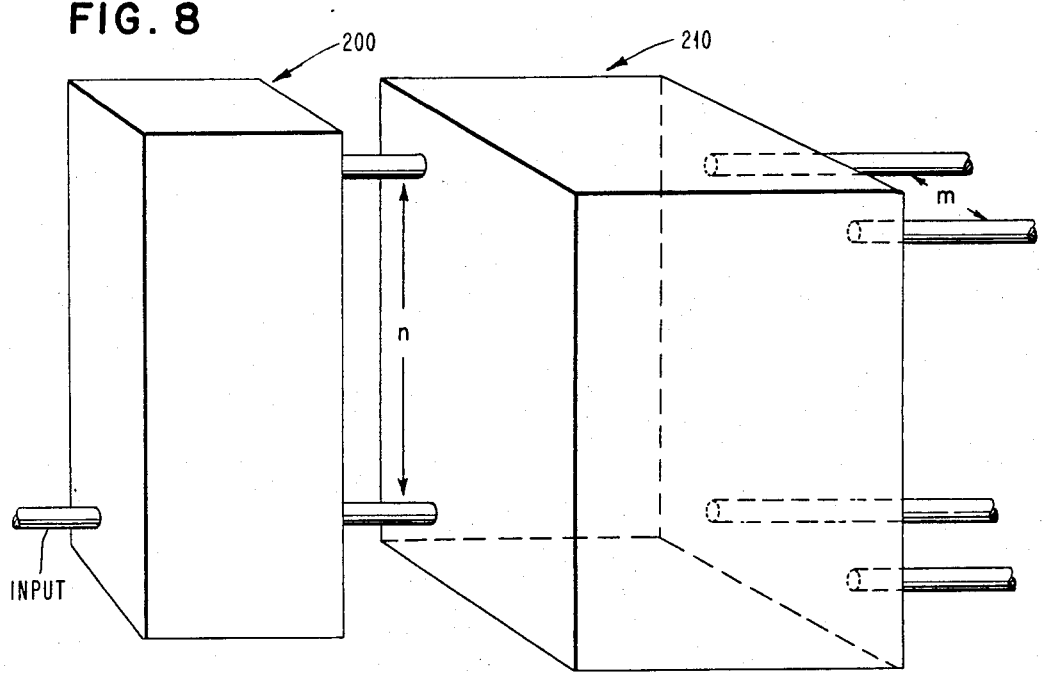
Figure 1:
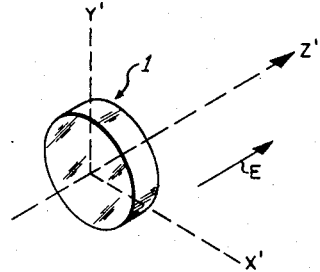
Figure 2:
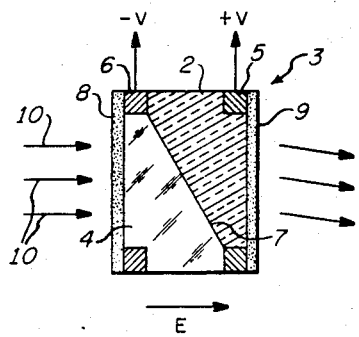
Figure 3:
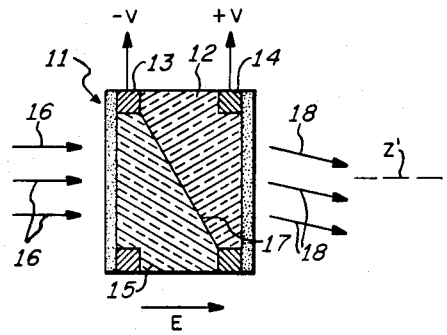
Figure 4:
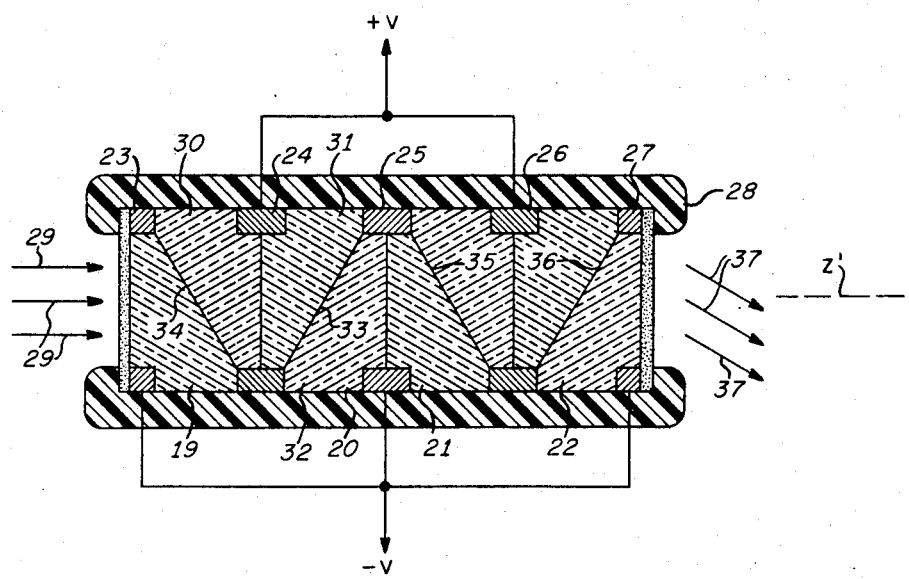

In the drawings:
FIGURES 1 and 2 are perspective views of a first embodiment of the present invention;
FIGURE 3 is a perspective view of a second embodiment of the present invention;
FIGURE 4 is a perspective view of a third embodiment of the present invention;
FIGURE 5 is a schematic illustration of a digital deflector constructed according to the principle of the invention using the five-three-one-one code;
FIGURE 6 is a diagram showing the index ellipsoid of a birefringent crystal;
FIGURE 7 is a graphical diagram of the relationship between the splitting angle $\epsilon$ and the cutting angle $\delta$ for calcite crystals; and
FIGURE 8 is a two-dimension light beam deflection system using the principles of the present invention.

Referring now, more particularly, to FIGURES 1 and 2, there is shown a light deflector for discretely positioning a small cross-sectional beam of linearly polarized light. A high intensity light is obtained from light source 10. The light source 10 is preferably a monochromatic source of light and is conveniently a continuous wave or pulsed laser light source. Other possible monochromatic light sources include carbon and mercury arc lamps with appropriate filters. The light is passed through collimating lens 12 where the light is collimated. The now collimated light passes through a linear polarizer means 14 wherein the light is linearly polarized. A portion of the preferably monochromatic, collimated and linearly polarized beam is passed through the aperture 18 in the plate 16. The portion of the light beam passing through the aperture 18 is directed to the first stage of the light deflection system.

Each light deflector stage includes two basic components. The first component which the light beam sees is a means 20 for receiving the input light beam and providing an output of one of two possible light beams. The two possible light beams are different from one another by 90 degrees in their polarization directions. The second component of the light deflection stage is a birefringent means 22.

The illustrated controllable device 20 for providing one of two possible light beams having polarizations differing by 90 degrees is electro-optic in nature. This controllable means 20 includes an electro-optic crystal 24 which may be, for example, potassium dihydrogen phosphate crystals, and a pair of transparent electrodes 26 on opposite sides of the electro-optic crystal 24. Alternatively, other types of electrodes may be substituted for the transparent electrodes. These include slit electrodes and electrode gratings or meshes.

The birefringent means 22 are crystals that are specially cut to allow the incoming light beam to pass through its body either as the ordinary or extraordinary ray but not both simultaneously, depending upon the entering polarization direction of the light beam. A linearly polarized light beam, polarized perpendicular to the plane of the drawing will pass, for example, through the birefringent means 22 without any deflection therein as the ordinary ray of the crystal. However, if the linearly polarized light beam is polarized parallel to the plane of the paper the light beam passes as the extraordinary ray in the direction different from the ordinary ray and leaves the crystal at a point spacially separated from the ordinary ray output position.

The light beam then passes on from the first deflection stage to the second stage which includes in this embodiment an electro-optic controllable means 30 and birefringent means 32. The electro-optic means 30 is made up of electro-optic active crystal 34 and transparent electrodes 36. The third and last of the illustrated deflection stages in the FIGURES 1 and 2 embodiment is made up of electro-optic controllable means 40 and birefringment means 42. The electro-optic controllable means includes as electro-optic active crystal 44 and transparent electrodes 46 enclosing the electro-optic crystal 44. It is understood that the three light deflection stages shown are for illustrative purposes only. Additional stages are added where more discrete light output positions are required.

The output position of the light beam from the light deflection system is controlled by a source of information in the form of electrical signals. The FIGURES 1 and 2 embodiment shows means responsive to the information source schematically illustrated as a potential source 50 and switching means 52, 54 and 56. The mechanical switching means are given as an aid to the understanding of the operation of the system. In the actual system electronic switching techniques in response to coded electric signals or pulses are used. The potential source 50 is of sufficient magnitude that when any of the switch means are closed an electric field is applied across the electro-optic means of each of the stages involved sufficient in magnitude for effectively rotating the plane of polarization of the light passing through the electro-optic means by 90 degrees.

The optical path length which the light beam must travel through the respective birefringent means of each stage or the thicknesses of each birefringent means in a given stage is seen in the drawing to be different. The varying thicknesses of the birefringent means is necessary to give an independent discrete output position for all possible combinations of switch closings. The preferred thickness variation in the series of birefringent means is an increase from one end to the other of the series of each subsequent birefringent means by a factor of two. The possible non-redundant output light deflector system positions are then base two to the power of the number of the light deflection stages. In the case of three stages, there would be eight non-redundant light output positions.

The operation of the FIGURES 1 and 2 embodiment of the present invention is initiated by a light beam passing from light source 10 through collimating lens 12, linear polarizer 14 and the aperture 18 of plate 16 to the first stage of the light deflector device. A small cross-sectional beam of collimated light, linearly polarized perpendicular to the plane of the drawing is thereby applied to the first stage of the light deflector system. For sake of example, in FIGURE 1, switching means 52 is closed and switching means 54 and 56 are open. An electric field is thereby developed across electro-optic active crystal 24 since the source of potential 50 is across the transparent electrodes 26 of this first electro-optic crystal in the series of controllable means. The light beam passing through the electro-optic crystal 24 has its plane of polarization rotated 90 degrees from its original entering position. If, for example, potassium dihydrogen phosphate is used as the electro-optic crystal 24, a voltage of approximately 7700 volts is required to cause the required polarization rotation. The beam passes on to the first stage birefringent means 22 where it is received as the extraordinary ray and it passes along path 22eo. It exits from the birefringent crystal 22 parallel to but spacially separated from its entering position. The light beam continues to the second light deflection stage. It passes through the electro-optic crystal 34 and the crystal's companion transparent electrodes 36 without change in its polarization. The light beam maintaining the polarization gained from the first stage controlling means 20, takes the extraordinary ray path 32eo in the second stage birefringent crystal means 32. The light beam passes then to the third light deflection stage. There again being no electric field across the third stage controllable means 40, the light beam continues without change in its polarization, passes through the third stage birefringent crystal 42 along the extraordinary ray path 42eo and exits at the uppermost output position.

The second extreme case illustrated by FIGURE 1 is the case where no electric field is applied to any of the electro-optic means. In this case, the light beam remains linearly polarized perpendicular to the plane of the drawing as effected by the linear polarizer 14 and passes through each of the birefringent means 22, 32 and 42 along their ordinary ray paths 22o, 32o and 42o.

FIGURE 2 illustrates the case where two of the three switches are closed and the source of potential 50 is applied across the controllable means 20 and 30. The linearly polarized beam enters the first stage controllable means 20 wherein the polarization of the beam is rotated 90 degrees. The polarized beam enters the first stage birefringent crystal 22 where it proceeds along the extraordinary ray path 22eo and exits parallel to but spacially displaced from its entering position. The second stage electro-optic crystal is activated, so the polarization of the light beam is again rotated 90 degrees. The light beam then passes on to the second stage birefringent crystal means 32 wherein it passes on the ordinary ray path 32o. The polarization of the light beam is not changed in the third stage controllable means 40 since the switch 56 is open. The light beam continues, therefore, through the third stage birefringent crystal along the ordinary ray path 42o and exits at a position midway between the extreme cases illustrated in the FIGURE 1 description above.

The second embodiment illustrated by FIGURE 3 is identical with the first embodiment except for the addition of a second controllable electro-optic means in each stage except the last. The second controllable electro-optic means in each stage is positioned on the side of the birefringent means opposite to the first electro-optic means. In the first deflection stage of FIGURE 3, where like numbers indicate like structure, the second controllable electro-optic means 60 includes an electro-optic crystal 62 and transparent electrodes 64. In this embodiment, the electric field is applied simultaneously, if at all, to both controllable electro-optic means in each deflection stage. It is preferable to apply the electric fields in opposite directions to rotate the polarization direction of the light beam back 90 degress, rather than forward 90 degrees, to cancel out dispersion effects caused by the electro-optic crystal. It is therefore seen that if the first controllable means rotates polarization of the light beam that the second electro-optic means in the light deflecrays. Useful biaxial crystals must be strongly birefringent and have an optic axial angle in the order of 90 degrees. Representative of this group are anthracene and naphthalene. Naphthalene has an angle of 13 degrees and 48 minutes between its ordinary and extraordinary rays.

The calculation of the maximum splitting angle between the ordinary and extraordinary rays in an optically birefringent crystal is readily understood with reference to FIGURE 6 wherein the symbols used are defined as:

IE: Principal section (X–Z plane) through the index ellipsoid of a crystal having the principal axes $n_o$ and $n_e$ $\delta$: Angle between the normal on the crystal and the Z axis of the index ellipsoid LO: Light beam—normally incident on the surface of the crystal OA: Path of the ordinary ray within the crystal OE: Path of the extraordinary ray within the crystal, which leads through O parallel to T $\epsilon$: Angle between OA and OE which is to be calculated ON: Direction of oscillation of the D vector of the extraordinary ray. The length of O–N is equal to the index of refraction $n_e'$ of the extraordinary ray. Due to the normal incidence of LO, ON lies in the surface of the crystal T: Tangent to IE at N $\delta$: Angle between T and the X axis The equation of the index ellipsoid is $$\frac{x^2}{n_e^2}+\frac{z^2}{n_e^2}=1$$

yielding for T $$\tan \delta = -\left(\frac{n_e}{n_o}\right)^2 \frac{x}{z} = \left(\frac{n_e}{n_o}\right)^2 \frac{1}{\tan \gamma}$$

Therefore $$\epsilon = \gamma + \delta - \frac{\pi}{2} = \gamma + \arctan \left(\frac{n_e}{n_o}\right)^2 \frac{1}{\tan \gamma} - \frac{\pi}{2}$$

The maximum condition $\partial \epsilon / \partial \delta = 0$ yields for $\epsilon_{max}$.

$$\epsilon_{max.} = \arcsin \frac{n_e}{\sqrt{n_e^2+n_o^2}} + \arctan \left(\frac{n_e}{n_o}\right) - \frac{\pi}{2}$$

The splitting angle between the ordinary and extraordinary rays $\epsilon$, for calcite has been calculated and is graphically shown versus the angle $\delta$ as FIGURE 7. The maximum splitting angle, $\epsilon_{max}$, for calcite is therein seen as 6° and 13 minutes. The angle $\delta$ for calcite is 41 degrees and 53 minutes at $\epsilon_{max}$ for the production of a birefringent crystal having the characteristic required by the birefringent means of the present light beam deflection system that will pass the light, for one of the two possible positions of the plane of polarization as an ordinary or extraordinary beam.

The maximum splitting angle $\epsilon_{max}$, and the corresponding cutting angle $\delta$ will, of course, vary from one birefringent material to another. For example, the angle $\delta$ for naphthalene is 51 degrees 55 minutes to obtain an $\epsilon_{max}$ of 13 degrees and 48 minutes.

FIGURE 8 illustrates how a two-dimensional light deflection system can be constructed using two of the light deflection systems described in the FIGURES 1 and 2, FIGURE 3 and FIGURE 5 embodiments. This two-dimensional deflection system is a first light deflection system 200, such as that of the entire FIGURE 1, with a second light deflection system 210, again such as the entire FIGURE 1, positioned at right angles to the system 200. The light beam remains collimated throughout all indexing operations so there is no information loss possible. The two-dimensional device gives $n$ times $m$ discrete positions wth digital addressing for each position.

The two-dimensional configuration has a great many uses. The device may be utilized for representing characters in display units or as a character generator for optical high speed printers. Recording of information is possible on heat or light sensitive mediums, such as copy papers of various types, photographic films and certain thermoplastic materials. Further, it can be controlled to operate as a flying-spot generator. The light deflection system may be directly controlled by the binary or other codes of a data processing machine. Desirable code conversions are readily possible by the suitable selection of the activating line to the individual controllable means for rotating the polarization plane and the dimensions of the birefringent means. Additionally, the relationships between the sequence of the controllable means and the thickness of the birefringent means makes it possible to use the arrangement for realizing logical connectives.

The invention thus provides a light deflection system of simplicity of geometry, compact, absence of jitter, excellent resolution, light position selection speeds of $10^{-6}$ to $10^{-8}$ seconds, and digitally controlled. The deflection of the light beam is not effected in proportion to one or a plurality of applied variable control voltages as is most continuous deflection systems. A digital to analog conversion of information step is not needed. The light beam deflection is caused by selectively activating the individual elements or groups of elements by means of a fixed, standardized voltage. Only in major voltage variations it is possible that, in addition to the desired position of the light beam, radiation paths are opened through which minor quantities of light reach other discrete positions. This effect is of minor importance because for even a 10 percent variation in the voltage for controlling the means for rotating the plane of polarization of the light beam through 90 degrees results in a maximum disturbing light intensity of 2.5 percent.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A light beam deflection system for interposition between a source of a beam of plane polarized light and a target to deflect the beam to a selected position in the target, comprising a beam deflecting stage interposed between said source and target and including in the order of the incoming beam of light, first means for selectively rotating the plane of polarization of the beam of light transmitted therethrough into one of two mutually orthogonal planes, birefringent means for passing the beam of light along one of two different paths dependent on the plane of polarization of the light, and second means having substantially the same characteristics as the first means for rotating the plane of polarization of the light in a direction opposite to that effected by the first means to cancel any polarization rotation effected by the first rotating means, whereby any dispersion effects of the first polarization means are substantially eliminated.

2. A light beam deflection system for interposition between a source of a beam of plane polarized light and a target to deflect the beam to a selected position in the target, comprising a plurality of aligned cascaded beam deflecting stages each stage except the last such stage having in the order of the incoming beam of light, first means for selectively rotating the plane of polarization of the beam of light transmitted therethrough into one of two mutually orthogonal planes, birefringent means for passing the beam of light along one of two different paths dependent on the plane of polarization of the light, and second means for rotating the plane of polarization of the light to cancel any polarization rotation effected by the first means of the same stage whereby the light beam enters each stage with the same plane of polarization, the last stage including said first polarization rotation means and said birefringent means.

3. The light beam deflection system of claim 2, wherein a first plurality of said stages include respective birefringent means having orientations providing deflections along a first common coordinate, and a second plurality of said stages including the last stage include respective birefringent means having orientations providing deflections along a second common coordinate.

4. A light beam deflection system for deflecting a light beam to a selected position in a target, comprising
a source of converging plane polarized light, and
a plurality of aligned cascaded beam deflecting stages each stage including in the order of the incoming beam of converging light,
means for rotating the plane of polarization of the beam of light transmitted therethrough into one of two mutually orthogonal planes, and
birefringent means having planar parallel entrance and exit faces for passing the beam of light along one of two different paths dependent on the plane of polarization of the light,
said beam of light having a location of convergence after the exit face of the last of said birefringent means, whereby each of said stages deflects said converging light.

5. The light beam deflection system of claim 4, wherein a first plurality of said stages include respective birefringent means having orientations providing deflections along a first common coordinate, and a second plurality of said stages include birefringent means having orientations providing deflections along a second common coordinate.

6. The light beam deflection system of claim 5, wherein each such stage except the last stage of the second plurality of such stages further comprises second means positioned after the birefringent means in the order of the incoming beam of light for rotating the plane of polarization of the light to cancel any polarization rotation effected by the other rotating means of that stage, whereby the light beam enters each stage with the same plane of polarization.

References Cited

UNITED STATES PATENTS

| 2,262,524 | 11/1941 | Ball | 350—160 |
| 3,243,724 | 3/1966 | Vuylstere | 331—94.5 |

FOREIGN PATENTS

| 727,451 | 11/1942 | Germany. |
| 976,610 | 12/1964 | Great Britain. |

OTHER REFERENCES

Electronics (TK 7800 E58), vol. 35, No. 45 pp. 30–32, Nov. 9, 1962.

Optical Processing of Information, edited by Pollach, Koester, and Tippett, Spartan Books, Inc. 1963, Chapter 8, pp. 98–103, by Schmidt. (This paper is a copy of a lecture given at the Symposium on Optical Processing of Information, held on Oct. 23 and 24, 1962, in Washington, D.C., and the information contained therein is considered to be a matter of public knowledge as of the date of the symposium.)

DAVID SCHONBERG, Primary Examiner

R. J. STERN, Assistant Examiner

U.S. Cl. X.R.

350—157

March 10, 1970     W. M. MACEK ET AL     3,499,701

ELECTRO-OPTICAL SCANNER

Filed Jan. 25, 1966

INVENTORS
WARREN M. MACEK
JOSEPH R. SCHNEIDER
BY
*Robert J. Haase*
ATTORNEY